C. T. ROTH AND E. P. NICHOLSON.
SPARK PLUG.
APPLICATION FILED MAY 12, 1920.

1,424,591.

Patented Aug. 1, 1922.

WITNESSES

INVENTOR
C. T. ROTH
E. P. NICHOLSON
BY
ATTORNEYS

UNITED STATES PATENT OFFICE.

CHARLES THEODORE ROTH, OF NEWARK, NEW JERSEY, AND EBERHARDT PETER NICHOLSON, OF RICHMOND HILL, NEW YORK.

SPARK PLUG.

1,424,591.      Specification of Letters Patent.      Patented Aug. 1, 1922.

Application filed May 12, 1920. Serial No. 380,800.

*To all whom it may concern:*

Be it known that we, CHARLES THEODORE ROTH and EBERHARDT PETER NICHOLSON, both citizens of the United States, and residents, respectively, of Newark, in the county of Essex and State of New Jersey, and Richmond Hill, Long Island, in the county of Queens and State of New York, have invented a new and Improved Spark Plug, of which the following is a full, clear, and exact description.

In connection with spark plugs, and more particularly that type of spark plug used in connection with an internal combustion engine, it is well appreciated that three paramount defects are experienced.

First. The first is that they are extremely difficult to clean, necessitating for the most part the separation of the several elements forming the plug, so that the carbon deposits accumulated within the same may be reached.

Second. The second defect experienced is that of "leakage," and this "leakage" exists at the points of contact of the poor and good conductors forming the plug, and is to be attributed to the fact that the core of porcelain or other suitable insulating material, has not the same ratio of expansion as the enclosing jacket and the centrally extending electrode. These elements, as it is well known are subjected to a high temperature during the operation of the engine, and are accordingly expanded. After the same has been subjected to an expanding and contracting action a number of times it will readily be appreciated that the leakage may come into being, and this "leakage," however slight, detracts from the power of the engine and serves to accelerate the carbonizing of the plug together with a general loss of efficiency in operation.

Third. The third defect of primary importance is that it has been impossible in most types of plugs to ascertain when the same are operating properly, and it has been usual to test a plug by grounding a metal object against some metal part of the engine or parts connected to the same, and bringing the object to a point adjacent the terminal of the plug.

This method of testing is subject to two criticisms. The first, the delay involved, and general annoyance experienced, and secondly, that it is not a true test in view of the fact that the "lead" extending from the "timer" may be bringing high tension current to the terminal of the plug from which point a spark may be drawn upon bringing a metal grounded object adjacent the same, without necessarily implying that a spark is being produced between the "block points."

With this in mind, we have constructed a spark plug which primarily will present such a construction as to be capable of being readily cleaned.

Another object of our invention is the construction of a plug which shall practically eliminate "leakage," and A further object of our invention is the provision of a plug in which a certain visible signal is associated in a series with the plug whereby the operation of the same may be instantly noted.

Reference is had to the attached sheet of drawings as illustrating one practical embodiment of our invention, and in which Figure 1 is a sectional side view of a plug constructed in accordance with our invention.

Figure 1:
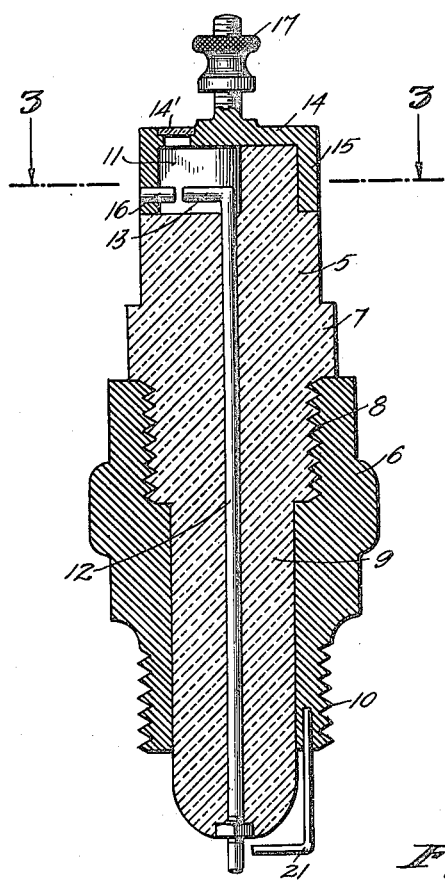
Figure 2:
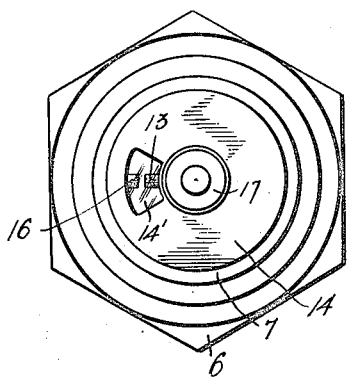
Figure 2 is a plan view thereof.

In these views the reference numeral 5 indicates the insulating core of material, having a ratio of expansion equivalent to that of metal, which core is provided with an enveloping jacket 6 of metal.

Now with a view of providing a leakproof mode of attachment between these members, the core is provided with a shoulder 7 directly below which the outer face of the same is conveniently formed with screw threads 8 adapted to engage the screw threads forming a part of the interior face of the jacket 6.

Prior to the inter-engagement of these parts, the screw threads 8 are conveniently coated with a fluid cement embodying heat resisting qualities, so that a movement of the jacket with respect to the core substance to the position of these parts is precluded.

The core is conveniently reduced, as at 9, and extends thence to a point below the lower edge of the jacket 6, it being noted that the same is in intimate contact with the face of the jacket throughout its entire length and contrary to the usual procedure wherein the core must necessarily have its lower end spaced from and above the lower edge of the jacket.

This construction prevents any accumulation of carbon at this point, and in the usual manner screw threads 10 are formed in the outer face of the jacket 6 adjacent its lower end to permit engagement of this member with the screw threads of the cylinder head.

To now provide means which will permit of an instant observation of the plug, the upper end of the core 5 is recessed as at 11, and the upper end of the central electrode 12 having its lower end projecting beyond the lower end of the core 5 is bent as at 13 within the recess 11.

A cap is now associated with the upper end of the core 5, this cap conveniently including an upper portion 14 and a depending annular side wall 15, the latter being provided with an inwardly extending pin 16 associated with its inner face, it being aligned with the bent portion 13 of the electrode 12 and spaced therefrom. A terminal cap 17 of any desired construction is associated with the cap, whereby the end of the lead wire extending from the timer may be secured in position.

It is to be noted that the upper portion 14 of the cap is conveniently provided with a sight opening 14' through which the ends of the pins 16 and electrode 12 may be viewed.

Figure 3:
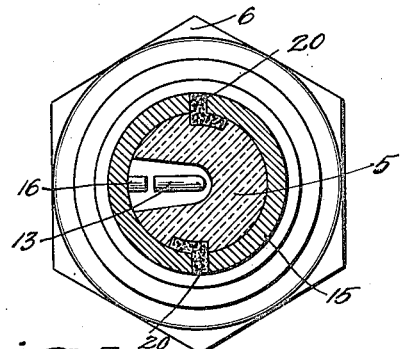
Figure 3 is a sectional view taken along the lines 3—3 of Figure 1.
Figure 4:
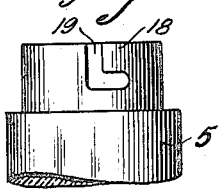
Figure 4 illustrates in detail the upper portion of that member forming the core of the plug.

Now to properly secure the cap in applied position, we conveniently form the core 5 with a reduced upper end portion 18 in the outer face of which bayonet slots 19 are provided, the ends of which conveniently merge into the upper surface of the core 5 as has been clearly illustrated in Figure 4. The cap is coated with a layer of cement, and is formed with openings 20 conveniently at diametrically opposite points, which openings are adapted to align with the inner ends of the bayonet slots 19 so that, as has been shown in Figure 3, the cement will key into the slots 19 and through the openings 20 of the cap, whereby to prevent any movement of one with respect to the other.

It will be appreciated that by the construction provided, that the current will pass from the terminals 17 to the pin 16, and providing that a spark is being formed by the plug, a spark will be produced which will bridge the space existing between the outer ends of the pin 16 and the bent upper end of the electrode 12. The current will now pass downwardly through the electrode 12 into the upper end of the same where it will bridge the space existing between this portion and the electrode 21 secured to the jacket 6, from whence it will ground back to the coil through the frame of the engine.

It will further be understood that numerous modifications of structure might readily be resorted to without departing from the scope of our claim, which reads.

We claim:

A spark plug, including a core having its side face formed with bayonet slots adjacent its upper end, a cap formed with openings adapted to encircle the upper end of said cap, said openings aligning with said bayonet slots, said slots being adapted to receive cement capable of keying into the same and through the cap openings whereby to prevent movement of the cap with said core, and means connected to said cap and associated with the core for forming a spark gap.

CHARLES THEODORE ROTH.
EBERHARDT PETER NICHOLSON.